(12) United States Patent
Kim et al.

(10) Patent No.: US 6,564,145 B2
(45) Date of Patent: May 13, 2003

(54) METHOD FOR FINDING SHORTEST PATH TO DESTINATION IN TRAFFIC NETWORK USING DIJKSTRA ALGORITHM OR FLOYD-WARSHALL ALGORITHM

(75) Inventors: Hong-Soo Kim, Kyoungki-Do (KR); Jong-Hyun Lee, Kyoungki-Do (KR); Youn-Suk Jeong, Seoul (KR)

(73) Assignee: Korea Telecom (KR)

( * ) Notice: Subject to any disclaimer, the term of this patent is extended or adjusted under 35 U.S.C. 154(b) by 0 days.

(21) Appl. No.: 09/752,324

(22) Filed: Dec. 27, 2000

(65) Prior Publication Data

US 2002/0059025 A1 May 16, 2002

(30) Foreign Application Priority Data

Nov. 12, 2000 (KR) ........................................ 2000-75334

(51) Int. Cl.[7] .............................................. G01C 21/23
(52) U.S. Cl. ..................................................... 701/209
(58) Field of Search ................................. 701/200–203, 701/206, 208–210; 340/988–990, 995

(56) References Cited

U.S. PATENT DOCUMENTS 5,657,231 A * 8/1997 Nobe et al. ................. 701/209
5,752,217 A * 5/1998 Ishizaki et al. ............. 701/201

OTHER PUBLICATIONS

"Dijkstra's Algorithm" from www.cs.usack.ca/resources/tutorials/csconcepts/graphs/tutorial/advanced/dijkstra/dijksrta.html.*
"Dijkstra's algorithm" from www.ece.nwu.edu/~guanghui/Transportation/spt/section3_1.html.*
"Dijkstra's algorithm" from www–comnet.technion.ac.il/netcourse/EE–046335/files/14.pdf.*
"Dijkstra's algorithm for solving the shortest path problem" from www.math.leidenuniv.nl/~monderwa.*
"Method of Finding the Shortest Path on a Road Network with Prohibited Pass", IBM technical Disclosure Bulletin, vol.41 No.01 Jan. 1998, pp. 721–722.*

* cited by examiner

Primary Examiner—Thu Nguyen
(74) Attorney, Agent, or Firm—Blakely Sokoloff Taylor & Zafman

(57) ABSTRACT

A method is presented for finding a shortest path from a starting place to a destination place in a traffic network including one or more turn restrictions, one or more U-turns and one or more P-turns using a Dijkstra algorithm. The method as sets a virtual arc between nodes, and assigns a virtual arc value. A smallest travel time value is selected out of total travel time values for all nodes except for the starting node, by considering existing arcs between nodes and the virtual arc and assigning the smallest travel time value to a permanent label node. The shortest path is determined by tracing the permanent nodes starting from the destination node.

5 Claims, 9 Drawing Sheets

METHOD FOR FINDING SHORTEST PATH TO DESTINATION IN TRAFFIC NETWORK USING DIJKSTRA ALGORITHM OR FLOYD-WARSHALL ALGORITHM

FIELD OF THE INVENTION

This invention relates to a method for finding a shortest path and a computer-readable record media storing instructions for performing the method; and more particularly, to a method for finding a shortest path in a traffic network using a Dijkstra algorithm and a Floyd-warshall algorithm and a computer-readable record media storing instructions for performing the method.

DESCRIPTION OF THE PRIOR ART

A Dijkstra algorithm and a Floyd-warshall algorithm are ones, which are frequently used for finding a shortest path.

The conventional Dijkstra algorithm makes it possible to find a shortest travel time value from a starting node to all other nodes in a network with nonnegative arc values. According to this algorithm, all nodes are classified into two groups of node. One is a permanent node that represents a shortest travel time value from a starting node to a relevant node. The other one is a temporary node that represents an upper bound of a real shortest travel time value from the starting node to the relevant node. Also, a label of a node refers to a shortest travel time value from the starting node along a path whose internal nodes are all permanently labeled. Initially, the starting node is labeled with the permanent node whose travel time value is zero.

According to the Dijkstra algorithm, a node having a minimum temporary label is selected to thereby become the permanent node. The Dijkstra algorithm terminates when all nodes including from the relevant node to neighboring nodes become the permanent node.

The Floyd-warshall algorithm makes it possible to find a shortest path between all pairs of nodes in a network.

According to the Floyd-warshall algorithm, a matrix of $\pi_{ij}$ is computed. The $\pi_{ij}$ denotes a travel time value for each of all pairs of nodes, i and j. A $\pi_{ij}^{(m)}$ denotes a matrix of a shortest travel time value from the node i and to the node j using 1, 2, ..., m−1 as the internal node. A $\pi_{ij}^{(k)}$ denotes a matrix of a travel time value for each of all pairs of nodes i and j within a starting node and an arrival node. A $\pi_{ij}^{(k+1)}$ is computed based on the $\pi_{ij}^{(k)}$. Here, a Triple operation needs to be performed in order to compute the $\pi_{ij}^{(k+1)}$.

FIG. 7 shows one embodiment of a Triple operation according to a Floyd-warshall algorithm.

Here, it is supposed that a $\pi_{ij}^{(m)}$ denotes a matrix for a shortest travel time value from the node i and to the node j using 1, 2, ..., m−1 as an internal node. A $\pi_{ij}^{(k+1)}$ is generated by calculating a given $\pi_{ij}^{(k)}$ on a following Triple operation.

That is to say, as for a shortest travel time using nodes 1, 2, ..., k as an internal node, if $\pi_{ij}^{(k)} < \pi_{ik}^{(k)} + \pi_{kj}^{(k)}$, $\pi_{ij}^{(k)} = \pi_{ij}^{(k+1)}$ without passing a node k, however if $\pi_{ij}^{(k)} > \pi_{ik}^{(k)} + \pi_{kj}^{(k)}$, $\pi_{ij}^{(k)} = \pi_{ik}^{(k)} + \pi_{kj}^{(k)}$ with passing the node k.

When representing the above by a mathematical equation, the equation is as follows:

$$\pi_{ij}^{(k+1)} = \min\{\pi_{ij}^{(k)}, \pi_{ik}^{(k)} + \pi_{kj}^{(k)}\}$$

In other words, a less one of $\pi_{ij}^{(k)}$ and $\pi_{ik}^{(k)} + \pi_{kj}^{(k)}$ is assigned to $\pi_{ij}^{(k+1)}$.

As described above, the conventional Dijkstra algorithm and Floyd-warshall algorithm are used to find a shortest path, however there is a problem that the same node should not be passed twice. Also, there is another problem that the above two algorithm cannot be applied to a real traffic network, in which a Left-turn restriction, a U-turn and a P-turn are included.

SUMMARY OF THE INVENTION

It is an object of the present invention to provide a method for finding a shortest path from a starting place to a destination place in a traffic network to thereby reach the destination place in shorter time.

In accordance with an aspect of the present invention, there is provided a method for finding a shortest path from a starting place to a destination place in a traffic network including one or more turn restrictions, one or more U-turns and one or more P-turns using a Dijkstra algorithm, the method including the steps of: assigning a virtual arc connection value from a starting node to a destination node based on traffic information in order to do the turn restriction, the U-turn and the P-turn, wherein the starting node indicates the starting place and the destination node indicates the destination place; selecting a smallest travel time value out of total travel time value for a temporary label node from the starting node to all nodes except for the starting node and assigning the smallest travel time value to a permanent label node; and determining the shortest path by tracing a permanent node stating from the destination node.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
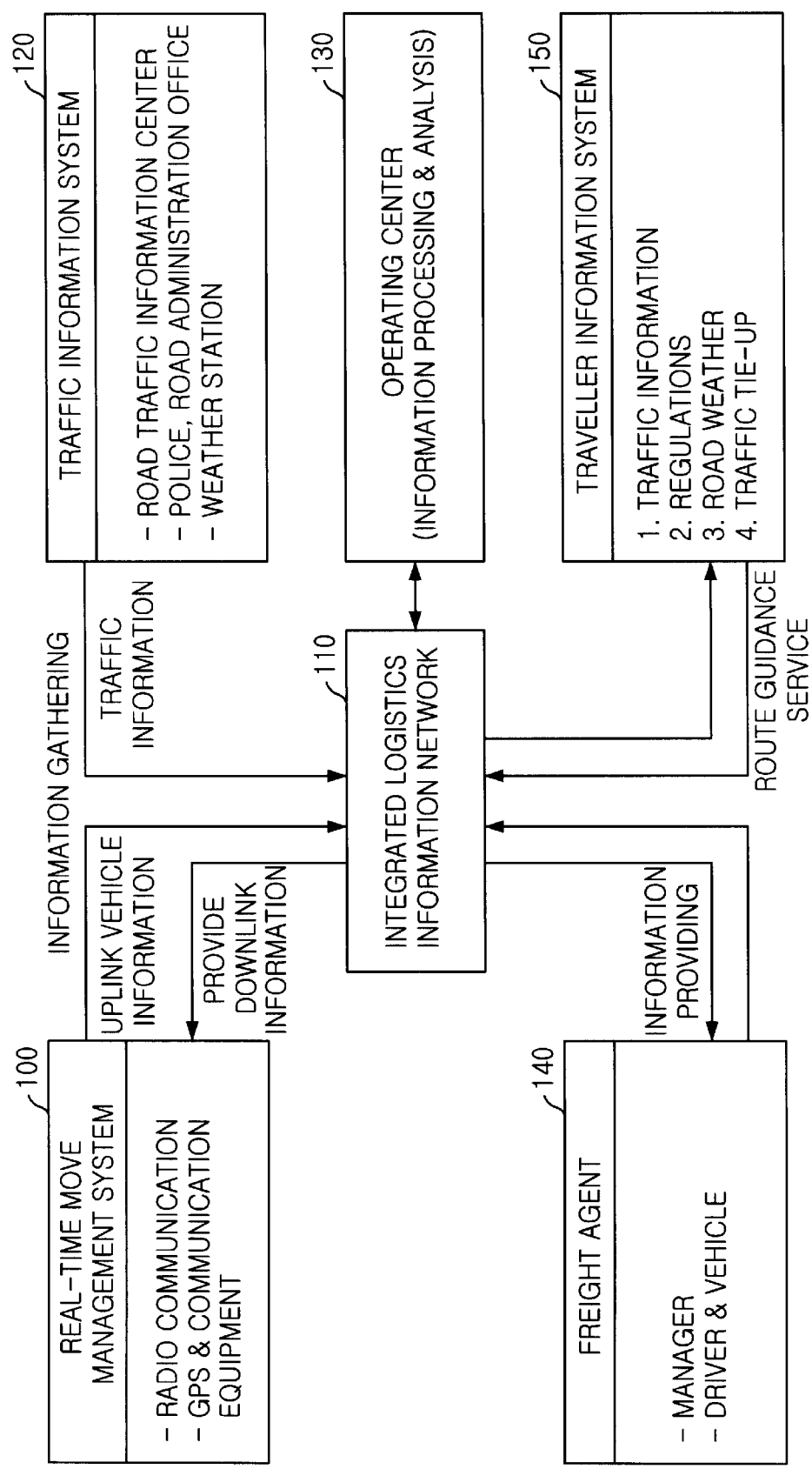
FIG. 1 shows a configuration of a DRGS (dynamic route guidance system) in accordance with the present invention.

FIG. 1 shows a configuration of a DRGS (dynamic route guidance system) in accordance with the present invention.

Reference numerals 100, 110, 120, 130, 140 and 150 denote respectively a real-time movement management system, an integrated logistics information network (ILIN), traffic information system, an operation center, a freight carrier and a traveler information system.

The traffic information system 120 includes, as a traffic information source, police, a road administrator, road traffic information center or the like. The freight carrier 140 includes a vehicle having an OBU (on board unit). Each vehicle can find a desired location using the equipment for the GPS and an operator of the freight carrier can perform monitoring information about a location of the freight and the vehicle, a travel time, a vehicle status, some freight loaded on a specific vehicle using the same.

The real-time movement management system 100, the traffic information system 120, the operation center 130, the freight carrier 140 and the traveler information system 150 are all coupled with one another through the integrated logistics information network (ILIN) 110.

The DRGS performs guiding a vehicle to an appropriate route, wherein a driver can escape from a traffic congestion to thereby reach his/her destination earlier. Accordingly, a traffic flow can be smooth and vehicle movement efficiency can be increased.

The DRGS needs to estimate a travel time along each path between crossroads and the estimation is based on data that are measured at each of a variety of time slots in the past time, wherein the data are collected using equipment for a GPS (global positioning system). In other words, the travel time estimation for next minutes is required because the traffic flow varies with short time. Also, when this estimation is compared with a next estimation for a traffic variable, it is possible to perform a proper traffic signal control and find an optimal route according to a status of the traffic flow.

As shown in FIG. 1, the real-time movement management system (RTMMS) 100 provides the operation center 130 with a vehicle location, a travel time, vehicle information or the like via an uplink and receives traffic information such as a new shortest path corresponding to a current traffic status via a downlink.

The traffic information system 120 receives information about an overall traffic from the road traffic information center, the police, the road administrator, a weather station or the like and provides the operation center 130 with the information.

The freight carrier 140 provides the operation center 130 with information about a location of the freight and the vehicle, the travel time, a vehicle status, some freight loaded on a specific vehicle or the like via the integrated logistics information network (ILIN) 110 and receives information analyzed in the operation center 130 via the same.

The traveler information system 150 provides the operation center 130 with information related to a route guidance service, for example, traffic information, regulations, a weather in the road and a traffic congestion via the integrated logistics information network (ILIN) 110 and receives information analyzed in the operation center 130 via the same.

Figure 2:
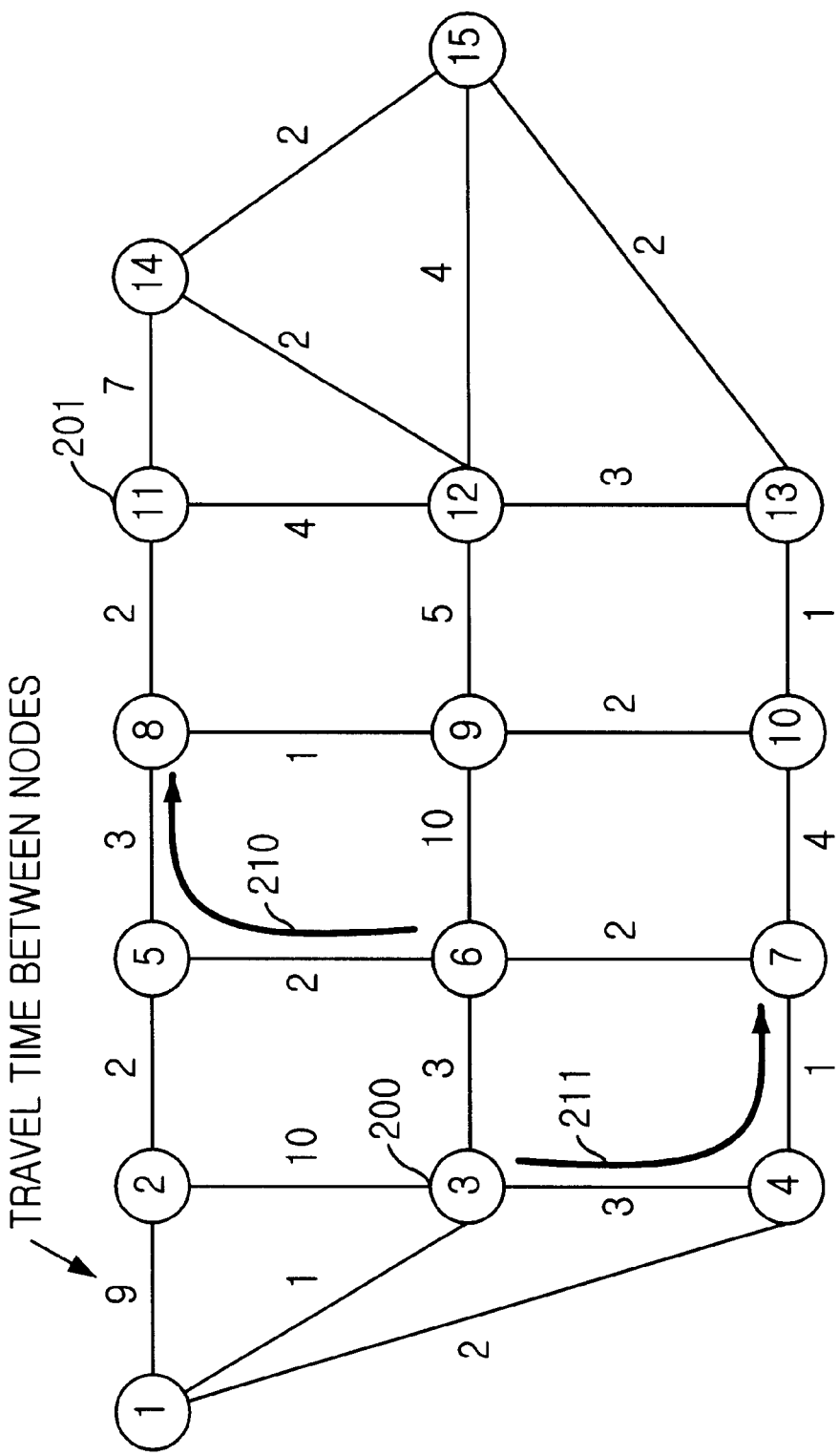
FIG. 2 shows a configuration of a traffic network including a turn-restriction.

FIG. 2 shows a configuration of a traffic network including a turn-restriction.

As shown in FIG. 2, a value on a corresponding path across two nodes represents a travel time value from one node to the other node. The Dijkstra algorithm in accordance with the present invention uses continuous three nodes including a previous permanent node, a current permanent node and a temporary node adjacent to the current permanent node in order to exclude the turn-restriction in the course of finding a shortest path. In other words, if a path along some continuous three nodes is identical to the turn-restriction path, the path cannot be the shortest path.

For example, it is assumed that a vehicle is going to travel from a starting node (3) 200 to a destination node (11) 201. If there are turn-restriction paths including a path 210 along nodes 6-5-8 and a path 211 along nodes 3-4-7, a shortest path is a path along nodes 3-6-7-10-9-8-11 and an optimal total travel time along the shortest path is 14, wherein 14 equals a sum of travel times on each path, that is, 3+2+4+2+1+2. Consequently, the turn-restriction paths including the path 210 along nodes 6-5-8 and the path 211 along nodes 3-4-7 cannot be paths as a comparison object in order to find a shortest path.

Figure 3:
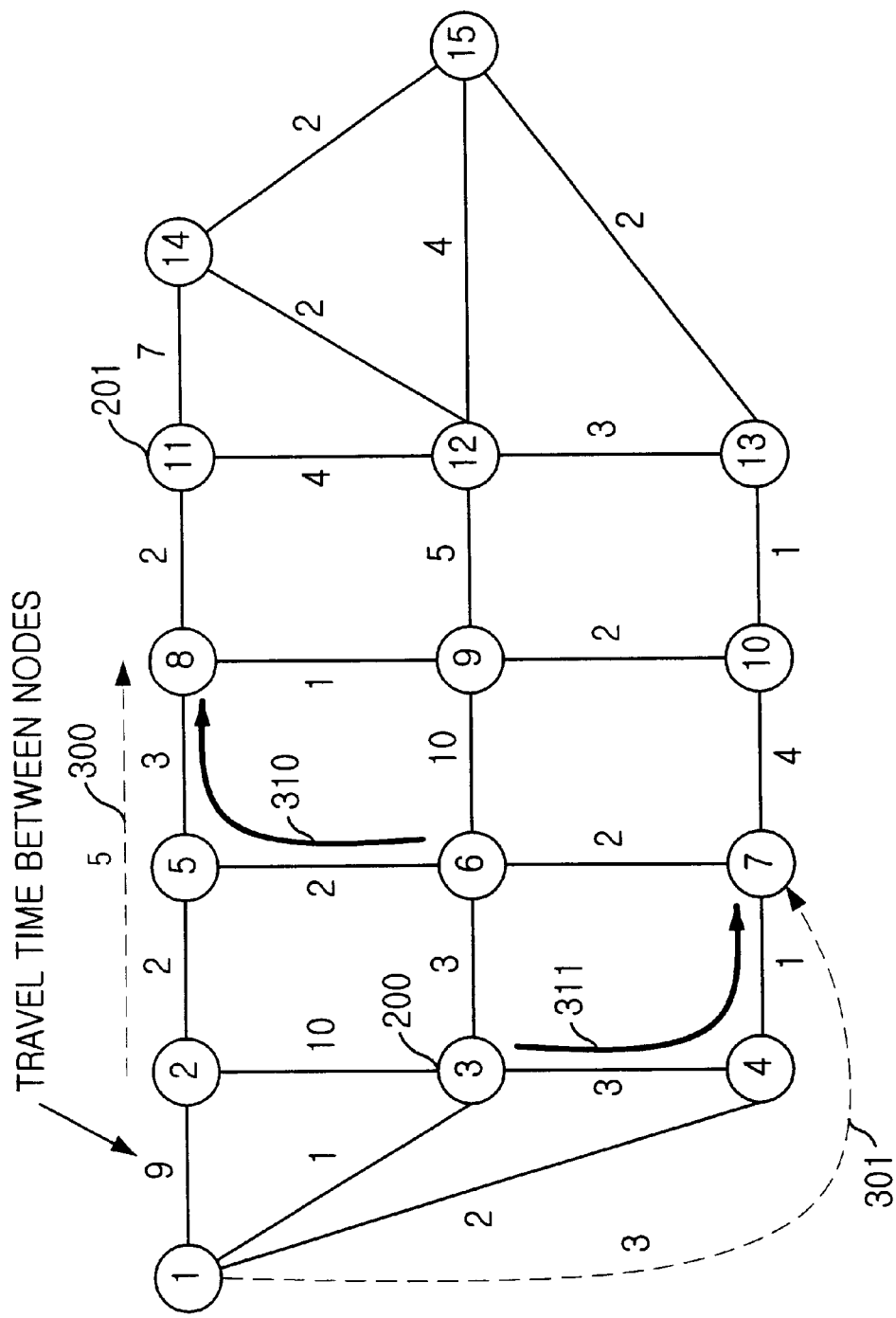
FIG. 3 is a configuration of a traffic network including a turn-restriction and a U-turn.

FIG. 3 is a configuration of a traffic network including a turn-restriction and a U-turn.

An improved Dijkstra algorithm in accordance with the present invention is applied to the traffic network in FIG. 3.

A virtual arc connection is used in consideration of the U-turn in applying the improved Dijkstra algorithm to the traffic network.

As shown in FIG. 3, each value between nodes represents a travel time value from one node to the other node and the traffic network includes two turn-restriction paths including a path 310 along nodes 6-5-8 and a path 311 along nodes 3-4-7. It is possible for a driver to do a U-turn along nodes 6-5-2-5-8 in order to travel from a node 6 to a node 8 and a U-turn along nodes 3-4-1-4-7 in order to travel from a node 3 to a node 7.

For the above two U-turns, the driver should pass the nodes 5 and 4 one more time, which the driver already passed. However, the U-turn cannot be used in the Dijkstra algorithm because the Dijkstra algorithm doesn't consider the U-turn path containing a node passed twice.

In accordance with the present invention, virtual arcs including a path 300 from a node 2 to a node 8 and a path 301 from a node 1 to a node 7 and virtual arc values (the virtual arc value=travel time) including a value of 5 for the path 300 and a value of 3 for the path 301 wherein 5=2+3 and 3=2+1, are used to find a shortest path according to the improved Dijkstra algorithm.

If each of the two virtual arc values 5 or 3 is respectively less than each of existing values from the node 2 to the node 8 or from the node 1 to the node 7, each virtual arc value is used to find the shortest path. Otherwise, each existing value is used to find the shortest path instead of the virtual arc value.

Figure 4:
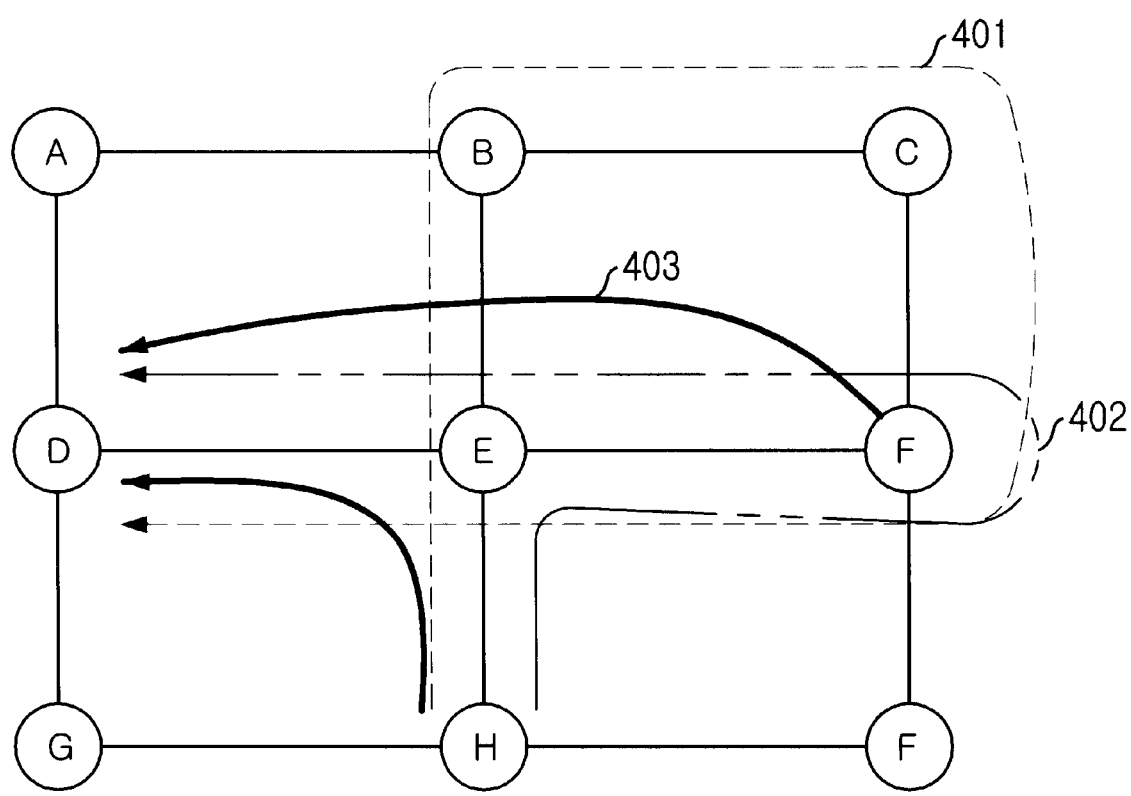
FIG. 4 is a configuration of a traffic network including a turn-restriction, a P-turn and a U-turn to which a Diijkstra algorithm is applied.

FIG. 4 is a configuration of a traffic network including a turn-restriction, a P-turn and a U-turn to which a Dijkstra algorithm is applied.

As shown in FIG. 4, a P-turn path 401 is formed along nodes H-E-B-C-F-E-D and a U-turn path 402 is formed along nodes H-E-F-E-D.

A virtual arc 403 from a node F to a node D is used to find a shortest path, wherein a node E is in the center of the virtual arc 403.

If there exists already an arc from the node F to the node D in the traffic network, a following consideration needs to be taken into. If a virtual arc value from the node F to the node D is less than an existing arc value, the virtual arc value is used to find the shortest path. In other words, if the travel time of the path from the node F to the node D via the node E is shorter than that of the other paths from the node F to the node D, the path 403 is selected to find the shortest path.

Figure 5A:
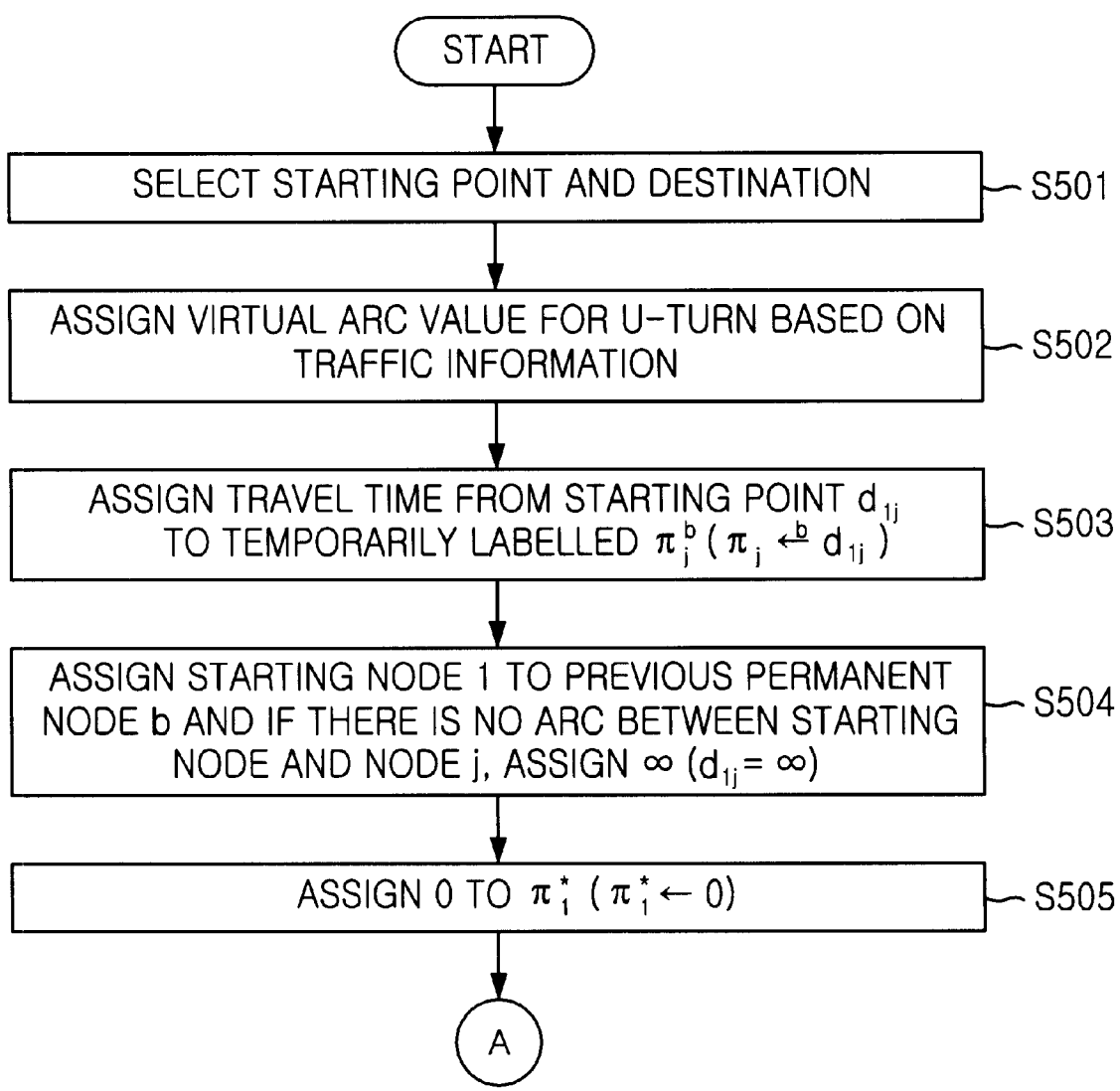
FIGS. 5A and 5B are flow charts illustrating one embodiment of an improved Dijkstra algorithm in accordance with the present invention.
Figure 5B:
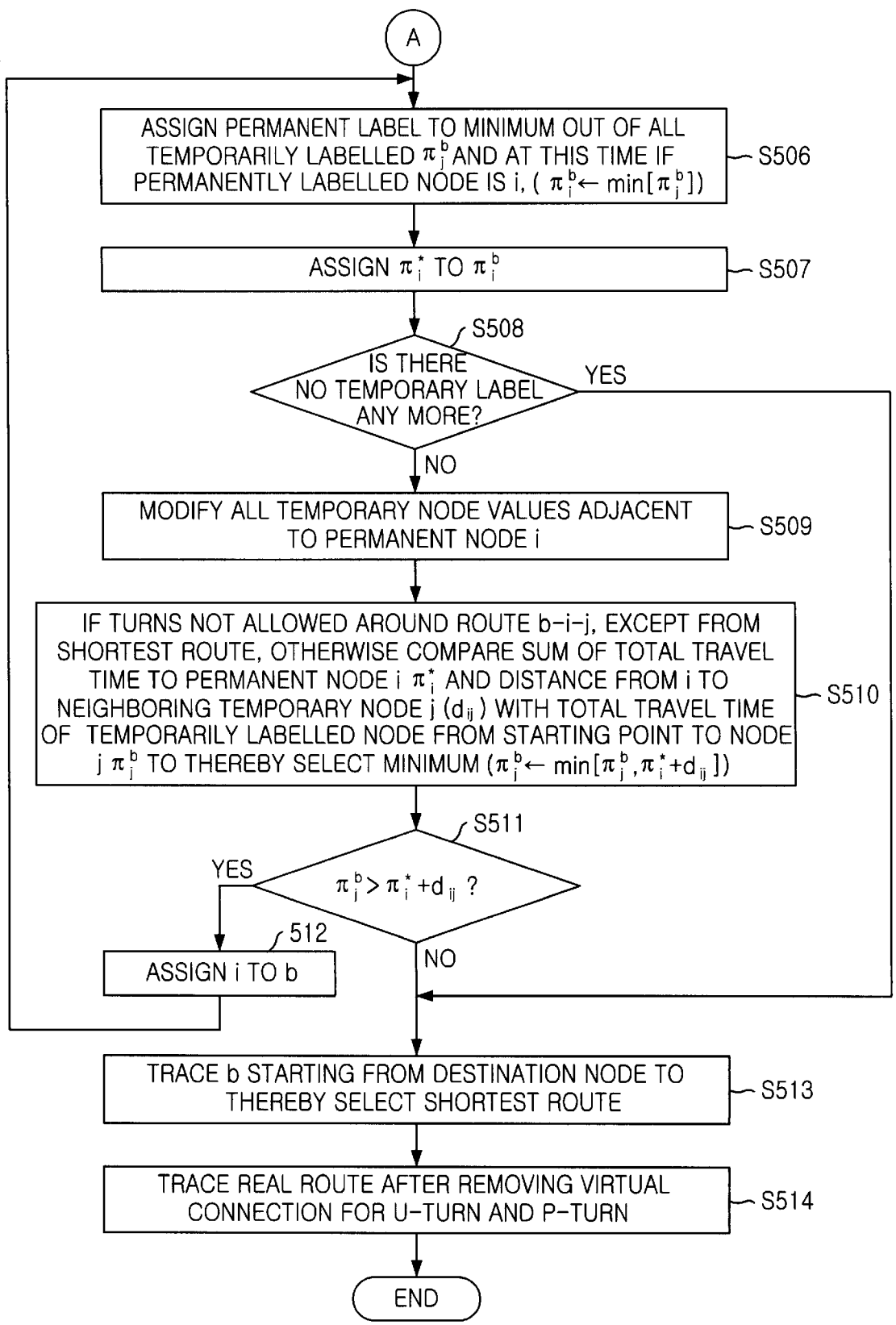

FIGS. 5A and 5B are flow charts illustrating one embodiment of an improved Dijkstra algorithm in accordance with the present invention.

As shown in FIGS. 5A and 5B, at the step S501, a starting node and a destination node are selected in a traffic network.

At the step S502, it is performed to assign a virtual arc value based on traffic information for a U-turn. In this case, if there exists already an arc in the traffic network, followings should be considered. Comparing the virtual arc value with an existing arc value, if the virtual arc value is less than an existing arc value, the virtual arc value is used to find a short path. Otherwise, the existing arc value is used.

At the step S503, it is performed to assign a $d_{1j}$ to a $\pi_j^b$. Here, the $d_{1j}$ represents a travel time value from a starting node, usually a node 1 to a node j. The $\pi_j^b$ represents a total travel time of a temporary label node from the starting node to the node j.

At the step S504, it is performed to assign the starting node 1 to a b and if there exists no arc between the starting node 1 and the node j, $d_{1j}=\infty$ (an infinite value). Here, the b represents a previous permanent node for the node j that is a temporary label node.

At the step S505, it is performed to assign 0 to a $\pi_1^*$.

A $\pi_j^*$ represents an optimal total travel time value from the starting node to the node j. Accordingly, the $\pi_1^*$ represents a total travel time value from the starting node to the node 1.

At the step S506, it is performed to select a shortest travel time for every temporary label $\pi_j^b$ assign a permanent label to the same. If a permanent label node is an i, a minimum value (min $[\pi_j^b]$) out of the total travel time of a temporary label node from the starting node to the node j ($\pi_j^b$) is selected to thereby be designated as a $\pi_i^b$.

At the step S507, it is performed to assign the $\pi_i^b$ to a $\pi_i^*$. The $\pi_i^*$ represents a total travel time value from the starting node to the node i.

At the step S508, it is performed determine if there exists no more temporary label, and if not, the logic flow proceeds to step S513, otherwise proceeds to step S509.

At the step S509, it is performed to modify all temporary nodes adjacent to the permanent node i.

At the step S510, if a path along nodes b-i-j is not the turn-restriction path, it is performed to compare the total travel time of the temporary label node from the starting node to the node j ($\pi_j^b$) with a sum of the total travel time value from the starting node to the permanent node i ($\pi_i^*$) and a travel time value from the permanent node i to a temporary node j adjacent to the i ($d_{ij}$) and then as a result of the comparison, select less travel time to thereby assign the less travel time (min $[\pi_j^b, \pi_i^*+d_{ij}]$) to a new total travel time of the temporary label node from the starting node to the node j ($\pi_j^b$). Here, if the path along nodes b-i-j is the turn-restriction path, the b-i-j path is excluded from the shortest path.

At the step S511, it is performed to determine if the new total travel time of the temporary label node from the starting node to the node j ($\pi_j^b$) is larger than the sum of the total travel time value from the starting node to the permanent node i ($\pi_i^*$) and a travel time value from the permanent node i to a temporary node j adjacent to the i ($d_{ij}$), and if not, the logic flow proceeds to step S513, otherwise proceeds to step S512.

If $\pi_j^b > \pi_i^*+d_{ij}$, at the step S512, it is performed to assign the previous permanent node i to b for $\pi_j^b$ and then the logic flow returns to the step S506.

At the step S513, it is performed to find a shortest path by tracing b representing a previous permanent node for the current permanent node, starting from the destination node.

At the step S514, it is performed to trace an actual path after eliminating a virtual arc for the U-turn and the P-turn.

Figure 6:
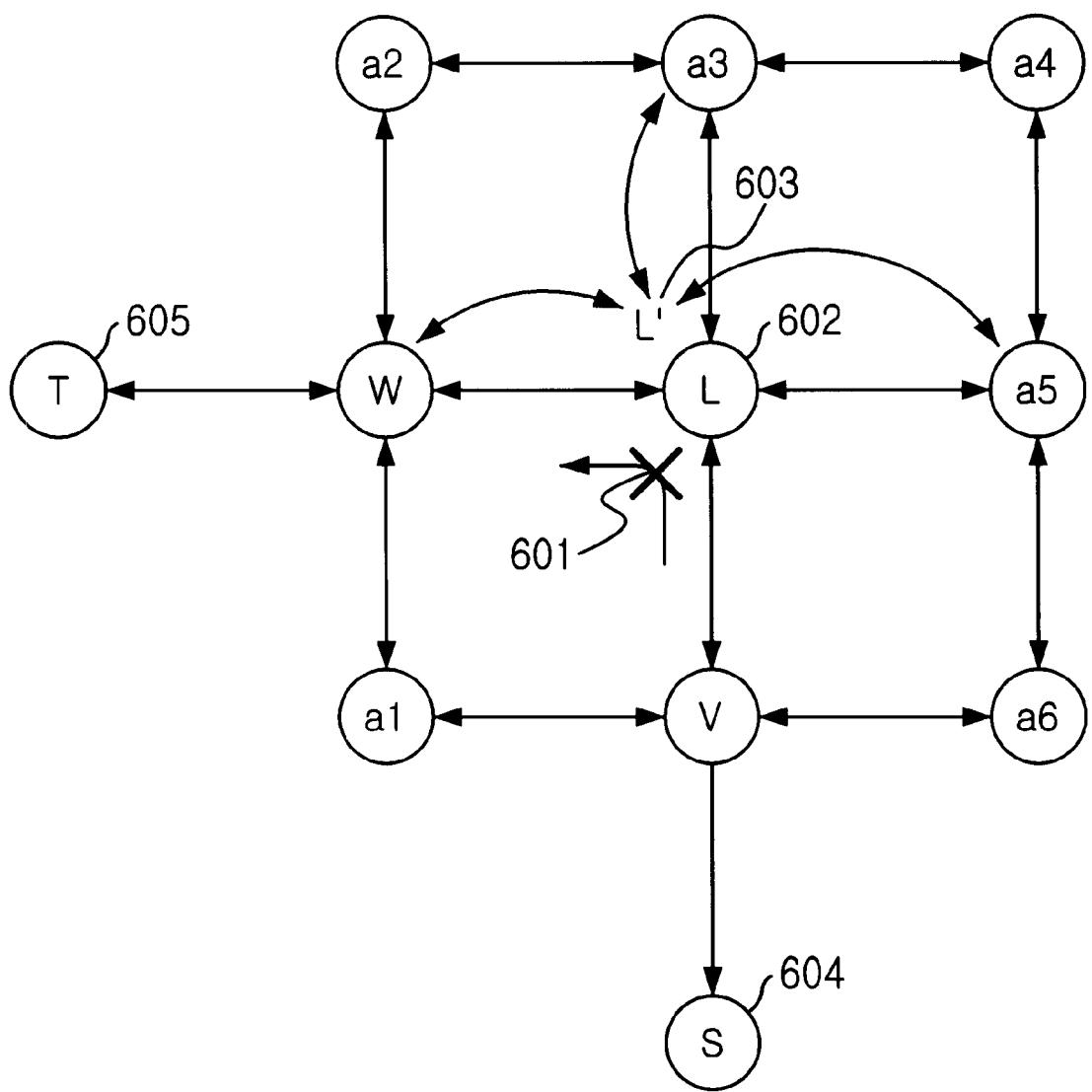
FIG. 6 is a configuration of a traffic network including a turn-restriction, a U-turn and a P-turn to which a Floyd-warshall algorithm is applied.
Figure 7:
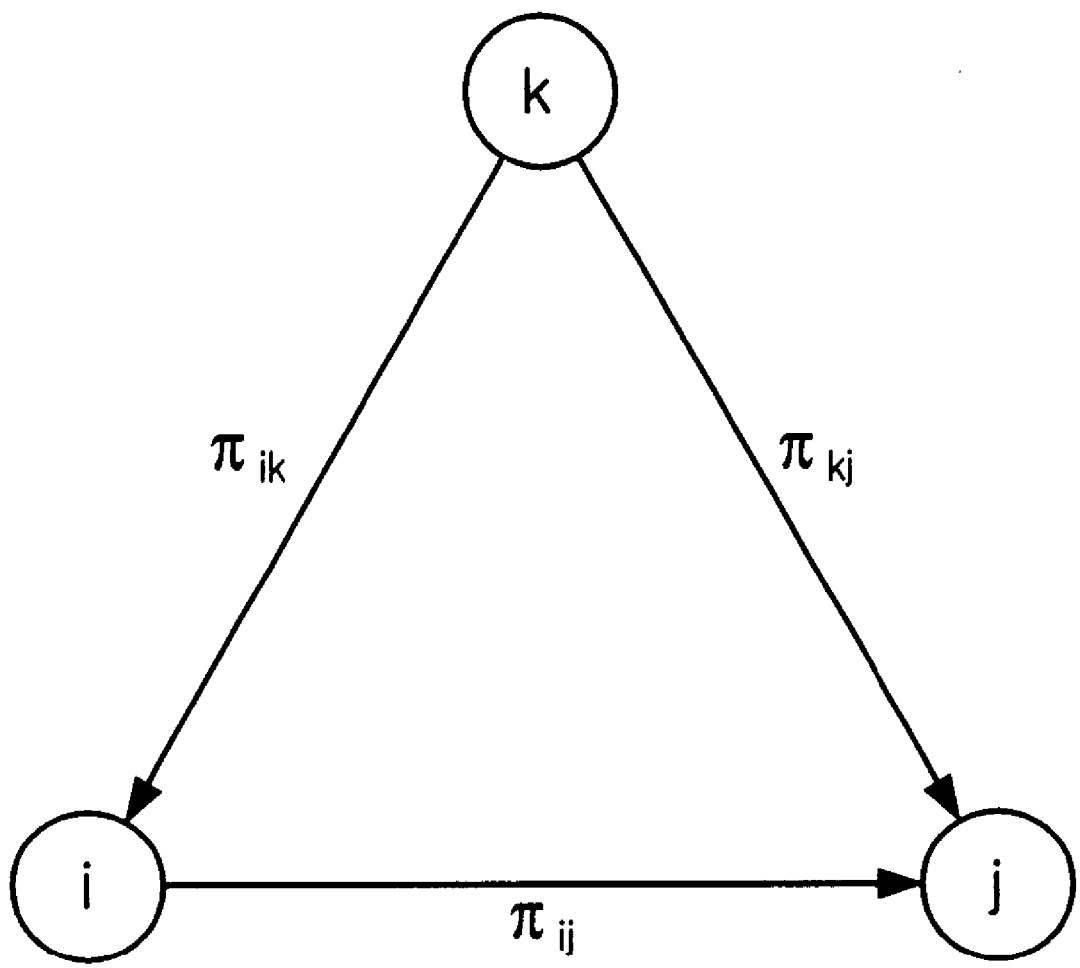
FIG. 7 shows one embodiment of a Triple operation according to a Floyd-warshall algorithm.

FIG. 6 is a configuration of a traffic network including a turn-restriction, a U-turn and a P-turn to which a Floyd-warshall algorithm is applied.

According to an improved Floyd-warshall algorithm, in case a turn restriction arc is included in a traffic network, the turn restriction arc is excluded from objects for a shortest path by assigning a significantly large value of a travel time, for example, an infinite value ($\infty$) to the arc.

As shown in FIG. 6, the traffic network includes a Left-turn restriction path 601 along nodes V-L-W, two U-turn paths including a path along nodes V-L-a3-L-W and a path along nodes V-L-a5-L-W and a P-turn path along nodes V-L-a3-a4-a5-L-W. The node L 602 is in the center of the traffic network.

When assuming that a starting node is a node S 604 and a destination node is a node T 605, the Left-turn restriction path 601 along the nodes V-L-W needs to be considered.

To find a shortest path, it is required to obtain a first shortest travel time matrix ($\pi_{ij}^{(k)}$) by considering two paths including a path along nodes V-a6-a5-L-W and a path along nodes V-a6-a5-a4-a3-L-W as if an arc along nodes V-L doesn't exist, that is, $\pi_{VL}^{(0)}=\infty$ and also to obtain a second shortest travel time matrix ($\pi_{ij}^{(k)}$) by considering two paths including a path along nodes V-L-a3-a2-W and a path along nodes V-L-a5-a4-a3-a2-W as if an arc along nodes L-W doesn't exist, that is, $\pi_{LW}^{(0)}=\infty$.

It is required to compare the first shortest travel time matrix ($\pi_{ij}^{(k)}$) with the second shortest travel time matrix ($\pi_{ij}^{(k)}$) to find the shortest path in the traffic network including the Left-turn restriction path 601 along the nodes V-L-W.

A major disadvantage on the above approach is that a computation time and a memory capacity are increased $2^n$ times as late and big, wherein the n of the $2^n$ denotes a number of the Left-turn restriction. Accordingly, the improved Floyd-warshall algorithm should be applied to the traffic network including a limited number of the Left-turn restriction.

The U-turn and the P-turn cannot be used to find an optimal path in a conventional shortest path algorithm because the conventional algorithm doesn't consider the U-turn and the P-turn containing a node passed twice.

As shown in FIG. 6, it is required to add a virtual node L' 603 in the traffic network. Consequently, it is possible to consider the P-turn along the nodes V-L-a3-a4-a5-L'-W and the two U-turns including the path along the nodes V-L-a3-L'-W and the path along the nodes V-L-a5-L'-W, each of which don't pass the same node twice.

Any virtual node can be added in a traffic network including any P-turns or U-turns, wherein a node needs to be in the center of the P-turns or the U-turns.

Figure 8:
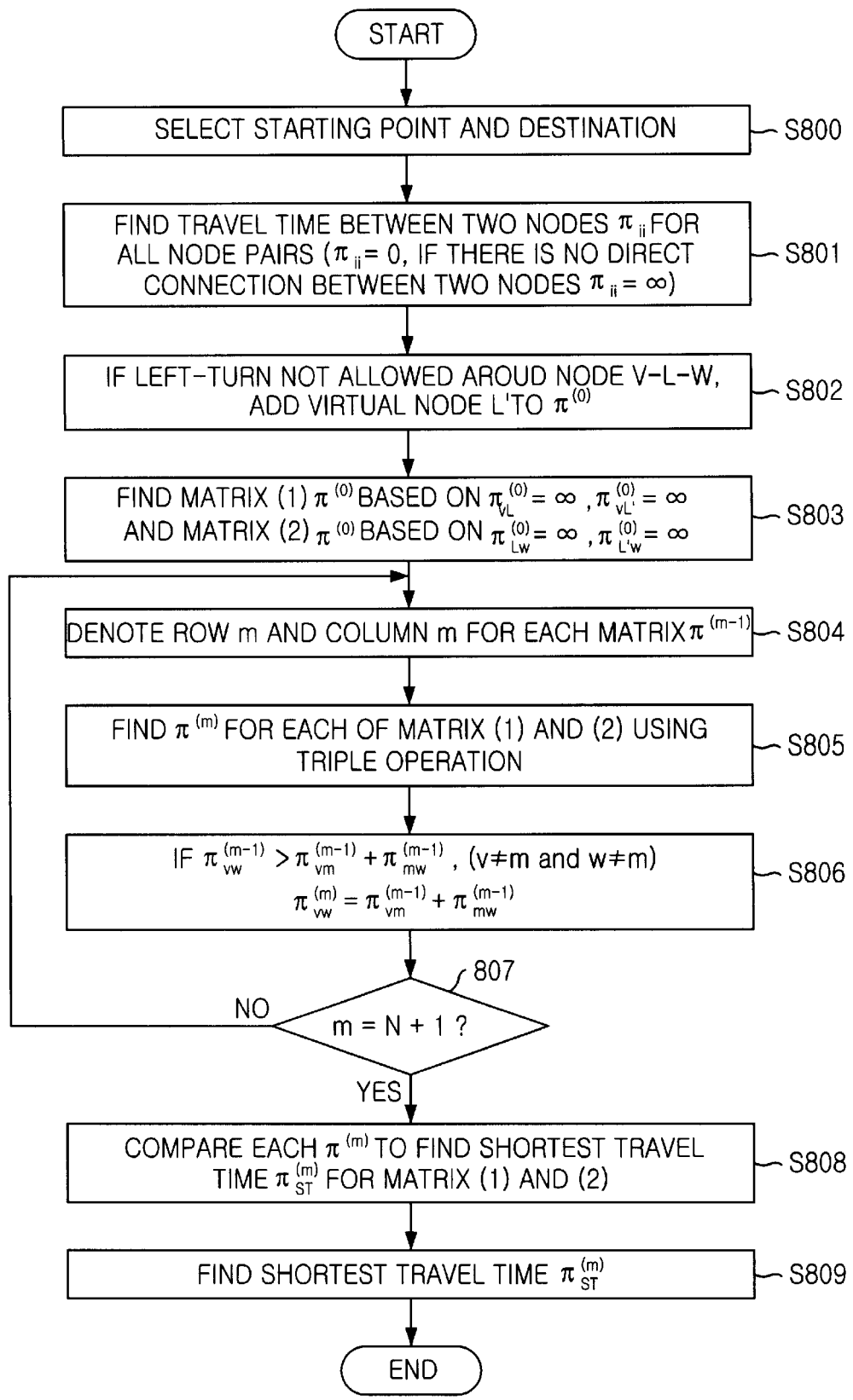
FIG. 8 is a flow chart illustrating one embodiment of an improved Floyd-warshall algorithm in accordance with the present invention.

FIG. 8 is a flow chart illustrating one embodiment of an improved Floyd-warshall algorithm in accordance with the present invention.

At the step S800, a starting node and a destination node are selected in a traffic network.

At the step S801, it is performed to compute a travel time value between two nodes ($\pi_{ij}$) for all pairs of nodes. If i=j, a $\pi_{ii}$ equals 0. That is to say, the travel time value between two nodes ($\pi_{ij}$) at the same node is 0. Also, if an arc doesn't exist between two nodes, the travel time value between two nodes ($\pi_{ij}$) equals an infinite value ($\infty$).

At the step S802, if a path along nodes i-L-j is a Left-turn restriction when i=V and j=W, it is performed to add a virtual node L' in an initialization matrix $\pi^{(0)}$.

At the step S803, it is performed to compute a first matrix $\pi^{(0)}$, assuming that $\pi_{VL}^{(0)}=\infty$, $\pi_{VL'}^{(0)}=\infty$ and compute a second matrix $\pi^{(0)}$, assuming that $\pi_{LW}^{(0)}=\infty$, $\pi_{L'W}^{(0)}=\infty$.

At the step S804, it is performed to indicate a row m and a column m in each matrix $\pi^{(m-1)}$.

At the step S805, it is performed to compute each $\pi^{(m)}$ for the first matrix and the second matrix using a Triple operation.

At the step S806, if $\pi_{VW}^{(m-1)} > \pi_{Vm}^{(m-1)} + \pi_{mW}^{(m-1)}$, (V≠m and W≠m), then $\pi_{VW}^{(m)} = \pi_{Vm}^{(m-1)} + \pi_{mW}^{(m-1)}$.

At the step S807, it is performed to determine if the above m equals N+1. The m represents a sum of the number of existing nodes and the number of virtual nodes, and if not, the logic flow returns to the step S804, otherwise proceeds to step S808.

If the above m equals N+1, at the step S808, it is performed to compare each $\pi^{(m)}$ to find a $\pi_{ST}^{(m)}$. The $\pi_{ST}^{(m)}$ represents a shortest travel time between the starting node S and the destination node T for the first matrix and the second matrix.

At the step S809, it is performed to find the $\pi_{ST}^{(m)}$.

It is possible to store instructions for performing the present invention in accordance with the present invention in a computer-readable record media.

There is an advantageous effect that a driver can reach his/her destination in shorter time along an optimal shortest route in a real-time dynamic route guidance system (DRGS) since techniques of a virtual arc connection, a virtual node or the like are applied to a plurality of road situations of a real traffic network including a turn restriction, a U-turn and a P-turn based on improved Dijkstra algorithm and Floyd-warshall algorithm in accordance with the present invention.

Also, there is another advantageous effect that it is possible to lower a computation time and memory capacity that are required to find a shortest route based on the improved Dijkstra algorithm in accordance with the present invention.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A method for finding a shortest path from a starting place to a destination place in a traffic network including one or more turn restrictions, one or more U-turns and one or more P-turns using a Dijkstra algorithm, the method comprising the steps of:
   a) selecting a starting node and a destination node in the traffic network, wherein the starting node indicates the starting place and the destination node indicates the destination place;
   b) setting a virtual arc between nodes in order to do the U-turn and the P-turn, and assigning a virtual arc value to the virtual arc;
   c) selecting a smallest travel time value out of total travel time values for temporary label nodes, which are all nodes except for the starting node, by considering existing arcs between nodes and the virtual arc and assigning the smallest travel time value to a permanent label node which is a node having the smallest travel time value among the temporary label nodes, wherein an existing arc of the turn restriction is excluded from a shortest path; and
   d) determining the shortest path by tracing the permanent nodes starting from the destination node.

2. The method as recited in claim 1, wherein the step b) includes the steps of:
   b1) when an existing arc, which connects the starting node and the destination node, having an existing arc value already exists in the traffic network, if the virtual arc value is less than the existing arc value, utilizing the virtual arc value for finding the shortest path; and
   b2) if the virtual arc value is larger than the existing arc value, utilizing the existing arc value for finding the shortest path.

3. The method as recited in claim 2, wherein the step c) includes the steps of:
   c1) assigning a travel time value $d_{1j}$ from a node 1 to a temporary label node j, wherein the node 1 is the starting node and the temporary label node is a node adjacent to the node 1, to a travel time value $\pi_j^b$ from the starting node to the node j;
   c2) assigning an infinite value ($\infty$) as the travel time value $d_{1j}$ from a node b to the node j if there exists no arc between the node b and the node j, wherein the node b is a previous permanent node of the node j and the starting node is initially assigned as the previous permanent node;
   c3) assigning 0 as the travel time value $d_{1j}$ from the node 1 to a total travel time $\pi_1^*$ from the starting node to the node 1;
   c4) selecting a node i having a shortest travel time value out of all $\pi_j^b$; assigning a permanent label to the node i; assigning the $\pi_j^b$ to a total time value from the starting node to the permanent label node i $\pi_i^*$; and determining if there exists any temporary label;
   c5) if there exists no temporary label, going to the step d);
   c6) if there exists any temporary label, modifying travel time value of all temporary label nodes adjacent to the permanent node i;
   c7) if a path along nodes b-i-j is the turn-restriction path, excluding the b-i-j path from a candidate shortest path;
   c8) if the path along nodes b-i-j is not the turn-restriction path, comparing the $\pi_j^b$ with a sum of the $\pi_i^*$ and a $d_{ij}$ and selecting the less one of the $\pi_j^b$ and the sum, to thereby assign the less one to the $\pi_j^b$, wherein the $d_{ij}$ represents a travel time value from the permanent node i to a temporary node j adjacent to the i; and
   c9) determining whether the $\pi_j^b$ is larger than the sum of the $\pi_i^*$ and the $d_{ij}$.

4. The method as recited in claim 3, wherein the step c9) includes the steps of:
   c9-1) if the $\pi_j^b$ is larger than the sum of the $\pi_i^*$ and the $d_{ij}$, assigning the current permanent node i to the previous permanent node b of the $\pi_j^b$, going to the step c4); and
   c9-2) if the $\pi_j^b$ is not larger than the sum of the $\pi_i^*$ and the $d_{ij}$, going to the step d).

5. A computer-readable record media storing instructions for performing a method for finding a shortest path from a starting place to a destination place in a traffic network including one or more turn restrictions, one or more U-turns and one or more P-turns using a Dijkstra algorithm, the method comprising the steps of:
   a) selecting a starting node and a destination node in the traffic network, wherein the starting node indicates the starting place and the destination node indicates the destination place;
   b) setting a virtual arc between nodes in order to do the U-turn and the P-turn, and assigning a virtual arc value to the virtual arc;
   c) selecting a smallest travel time value out of total travel time values for temporary label nodes, which are all nodes except for the starting node, by considering existing arcs between nodes and the virtual arc arid assigning the smallest travel time value to a permanent label node which is a node having the smallest travel time value among the temporary label nodes, wherein an existing arc of the turn restriction is excluded from a shortest path; and
   d) determining the shortest path by tracing the permanent nodes starting from the destination node.

* * * * *